No. 719,985. PATENTED FEB. 10, 1903.
E. ATTERBY.
THILL COUPLING.
APPLICATION FILED DEC. 22, 1902.
NO MODEL.
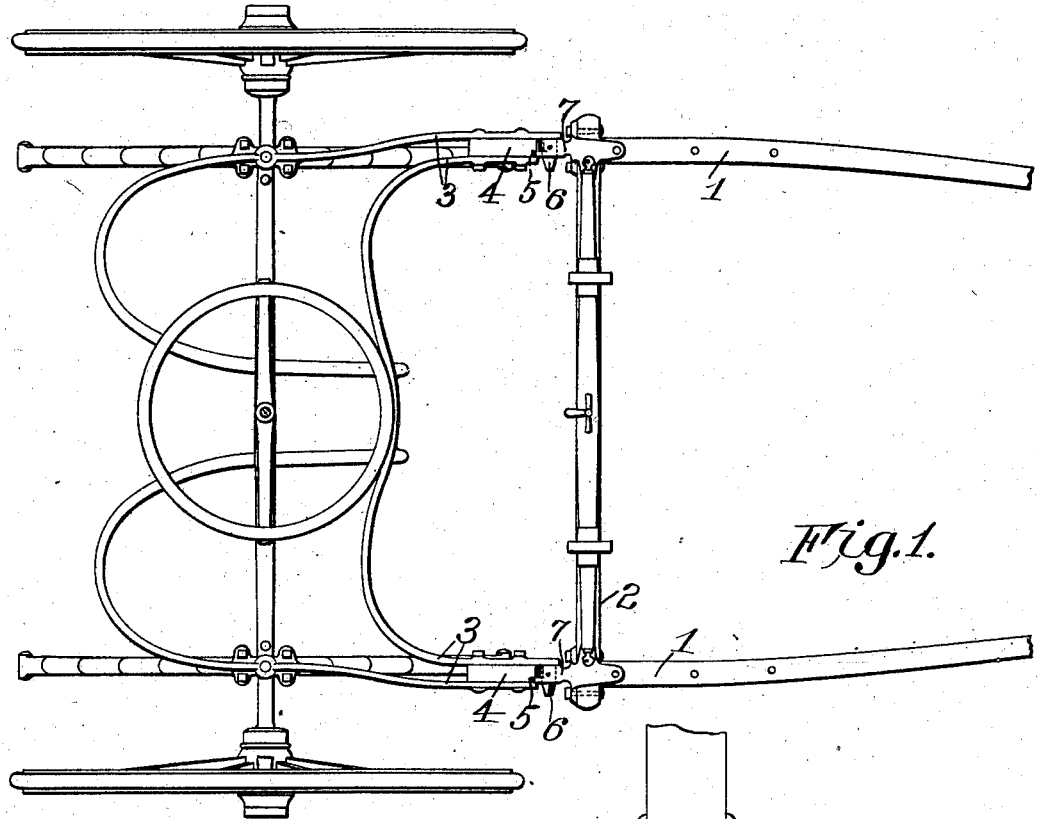
Fig. 1.
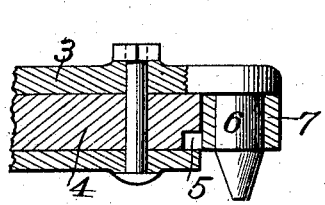
Fig. 4.
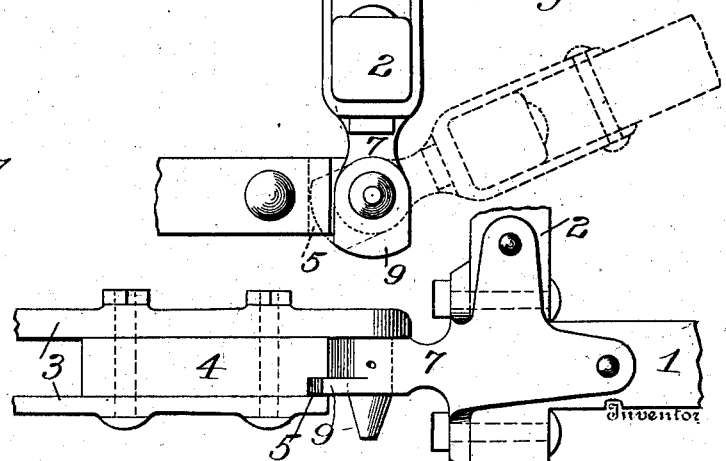
Fig. 2.
Fig. 3.
Witnesses
Walter B. Payne.
G. Willard Rich.
Inventor
Edward Atterby
by
his Attorney

UNITED STATES PATENT OFFICE.

EDWARD ATTERBY, OF ROCHESTER, NEW YORK, ASSIGNOR TO JAMES CUNNINGHAM SON, AND COMPANY, OF ROCHESTER, NEW YORK, A FIRM.

THILL-COUPLING.

SPECIFICATION forming part of Letters Patent No. 719,985, dated February 10, 1903.

Application filed December 22, 1902. Serial No. 136,138. (No model.)

*To all whom it may concern:*

Be it known that I, EDWARD ATTERBY, of Rochester, in the county of Monroe and State of New York, have invented certain new and useful Improvements in Thill-Couplings; and I do hereby declare the following to be a full, clear, and exact description of the same, reference being had to the accompanying drawings, forming a part of this specification, and to the reference-numerals marked thereon.

My present invention has for its object to provide an improved device for attaching thills to the hound or running-gear of vehicles, which shall be simple and cheap in construction and by means of which the thills or shafts may be quickly applied and removed when desired; and to this end it consists in certain improvements and combination of parts, all as will be more fully described and the novel features pointed out in the claims at the end of the specification.

In the accompanying drawings, Figure 1 is a plan view showing the running-gear of a vehicle and a pair of shafts or thills embodying my invention. Fig. 2 is a side elevation of the thill-coupling, showing the manner of applying the device in full lines and the dotted lines the position of the parts when in use. Fig. 3 is an enlarged plan view of the coupling. Fig. 4 is a horizontal sectional view.

Similar reference-numerals in the several figures indicate similar parts.

1 indicates the shafts of the vehicle, connected, as usual, with the cross-bar 2 in any suitable manner.

3 indicates metal stay plates or arms attached to or forming a part of the running-gear of a vehicle, and near the ends of said stays or plates and interposed between the same are bolted or otherwise secured filling-blocks of wood, said filling-blocks being provided on one side with a recess or cut-away portion 5. The outer stay arm or plate 3 on one side of the vehicle and the corresponding inner stay-plate on the other side are provided with pins 6, preferably conical at their free ends, as shown, and are each of a length sufficient to extend past the end of the corresponding stay-plate 3, as shown in Figs. 1, 3, and 4. Secured to the ends of the thills or shafts 1 and also, preferably, to the cross-bar 2 are the shaft-socket plates 7, having the extensions provided with the eye or socket adapted to fit the cylindrical portion of the pins 6 on the stay-plates and having formed integrally therewith a segmental projection 9, adapted when the thills are in normal position and coupled to the vehicle to enter the recess 5 at the side of the shorter arms of the stay-plate and prevent the lateral movement of the shafts longitudinally of the pins 6. As the pins 6 project in the same direction and are on either side of the vehicle, the thills may be readily applied by registering the eyes 8 thereon with the pins 6 while said thills are in a vertical position, as shown in full lines in Fig. 2, and when dropped to their normal position, as shown in dotted lines in said figure, the ears or lugs 9, passing beyond the shorter stay-plates 3 and in the recess 5, will prevent the lateral movement necessary to effect their disengagement.

This form of coupling enables the thills to be readily applied or removed from the vehicle when desired and effectually holds them from movement when in use, excepting the slight vertical pivotal movement necessary. Instead of forming the plates 3 integral with the running-gear, as shown, they might be connected, as in a casting or forging, forming a separate structure applicable to ordinary vehicles, or the plates could be short and separately applied, if desired.

I claim as my invention—

1. In a thill-coupling, the combination with one coupling member having arms of different lengths, the longer arm having a transverse pintle extending in proximity to the end of the shorter arm, of the other coupling member having a socket-piece adapted to cooperate with the pintle and movable longitudinally thereof and an extension adapted to pass the shorter arm of the other coupling member when the socket is moved longitudinally of the pintle in one position and to engage said arm and prevent longitudinal movement when rotated upon the pintle to another position.

2. In a thill-coupling for vehicles, the combination with the running-gear having at each side two pairs of arms or plates of different lengths, the longer arms having pintles extending laterally in the same direction and in proximity to the corresponding shorter plates, of the thills having socket-pieces thereon adapted to coöperate with the pintles and capable of movement longitudinally thereof when in one position and having arms or extensions at one side adapted to coöperate with the inner sides of the shorter arms of the other coupling members when the thills are moved to normal position, thereby preventing the disengagement of the parts by the movement of the thills longitudinally of the pintles.

EDWARD ATTERBY.

Witnesses:
G. WILLARD RICH,
RUSSELL B. GRIFFITH.